Aug. 16, 1960
R. H. BOLTON
2,949,576
ELECTROMAGNETIC PICK-OFF DEVICE
Filed Oct. 4, 1954
2 Sheets-Sheet 1
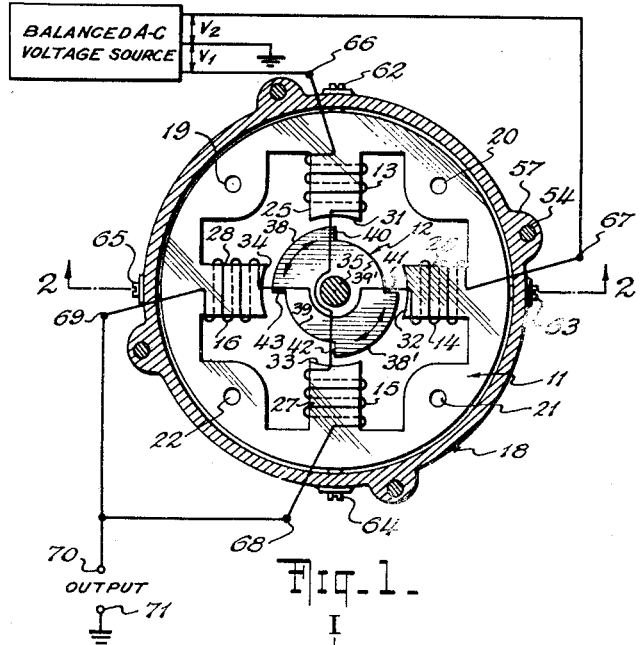
Fig_1_
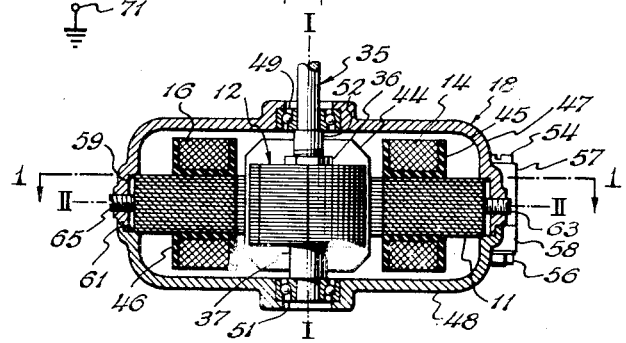
Fig_2_
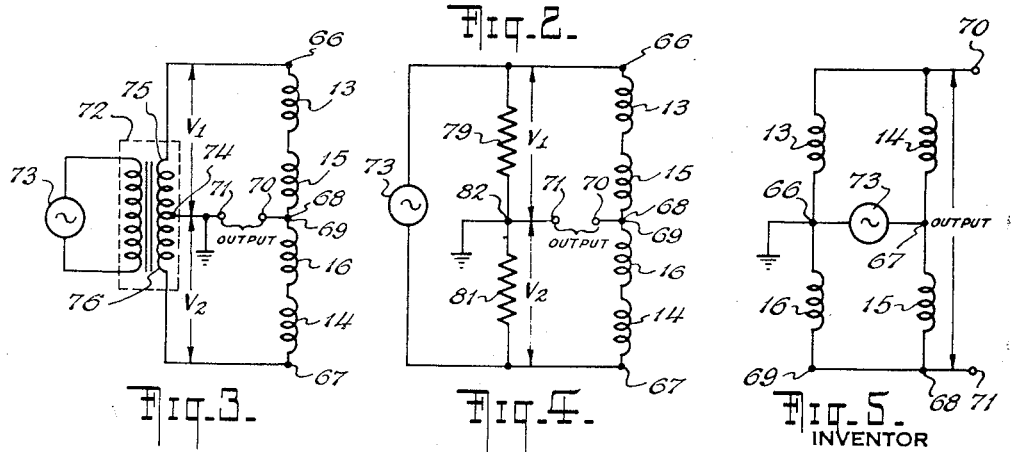
Fig_3_  Fig_4_  Fig_5_
INVENTOR
ROBERT HAVELOCK BOLTON
BY
ATTORNEY

INVENTOR
ROBERT HAVELOCK BOLTON
BY
ATTORNEY

United States Patent Office 2,949,576
Patented Aug. 16, 1960

2,949,576

ELECTROMAGNETIC PICK-OFF DEVICE

Robert Havelock Bolton, East Meadow, N.Y., assignor to Sperry Rand Corporation, a corporation of Delaware Filed Oct. 4, 1954, Ser. No. 460,001

2 Claims. (Cl. 323—75)

The present invention relates to electromagnetic signal generator or pick-off devices for providing an electrical output which is a function of mechanical input data supplied thereto.

A pick-off device is often utilized as part of a servo system for providing a voltage signal which is a function of the mechanical displacement between two relatively movable objects which are required to be maintained in a predetermined relative position with respect to each other. Signal generators of the electromagnetic type comprise one class of such devices.

Electromagnetic pick-off devices heretofore widely utilized in gyroscopic control systems, for example, are comprised of primary transformer winding means, one or more pairs of secondary transformer windings and a movable armature of magnetic material associated with the windings for differentially controlling the reluctances of the paths for the magnetic fields thereof. If the primary winding means is excited by an alternating current input voltage, the magnitude and phase of an induced output voltage signal derived from the secondary windings are functions of the magnitude and direction of armature displacement from a predetermined position with respect to the windings.

One specific type of such a pick-off device known in the art is comprised of a stator of magnetic material having four symmetrical, inwardly extending arms spaced 90 mechanical degrees apart for supporting four serially-connected primary transformer coils therearound, respectively. Four secondary transformer coils are supported around the four primary coils, respectively, the secondary coils being connected in two series-aiding groups. A specially shaped magnetic armature is supported within the stator for rotation about an axis concentric with pole faces of the four stator arms for changing the reluctances of the paths for the magnetic fields of the coils. The magnitude and phase of an induced output voltage signals derived from the secondary transformer coils upon excitation of the primary coils with a suitable alternating current input voltage are functions of the angle and direction of rotation of the armature from a symmetrical position whereat the reluctances of the magnetic paths for the coil fields are substantially equal to each other.

Transformer type pick-off devices as aforedescribed are subject to harmonic resonances in the secondary windings thereof and undesirable capacitive coupling between primary and secondary windings, thereby reducing the signal-to-noise ratio of the output voltage signal provided and increasing the magnitude of the null voltage signal provided at the null position of the armature thereof. Furthermore, electrical centering of the device for providing an optimum null output voltage signal is difficult, such devices being subject to stringent tolerance specifications.

It is an object of the present invention to provide an improved electromagnetic pick-off device for providing an output voltage signal which is a linear function of relative angular displacement between two objects.

It is a further object of the present invention to provide such a device wherein no primary and secondary transformer windings are required to be utilized therein and whose output voltage signal is substantially free of harmonics.

It is yet another object of the present invention to provide such a device which is readily centered electrically for providing a substantially zero output voltage signal at a null position for the armature.

It is still a further object of the present invention to provide an electromagnetic pick-off device of improved performance wherein harmonic amplification is minimized and the signal-to-noise ratio of the output voltage signal provided is improved relative to that provided by electromagnetic pick-off devices heretofore known in the art.

It is a further object of the present invention to provide an electromagnetic pick-off device as aforedescribed which is more readily reproducible than electromagnetic pick-off devices heretofore known in the art.

The foregoing and other objects and advantages of the present invention are attained by providing an electromagnetic pick-off device comprising a plurality of inductance coils disposed around an axis of rotation of an armature, the coils being connected together in a bridge-type circuit. The armature is supported adjacent the inductance coils for relative angular displacement with respect thereto for changing the impedances thereof so that an alternating current output voltage signal is provided across one pair of alternate junctions of the bridge-type circuit whose magnitude is a function of the relative armature displacement from an angular position whereat the circuit is balanced and a substantially zero null output voltage signal is provided. The output voltage signal is of one phase for relative armature displacements to one side of the null position and of an opposite phase for relative armature displacements to the other side of said null position.

Referring to the drawings,

Fig. 1 is a plan view of an electromagnetic pick-off device in accordance with a first embodiment of the present invention, windings about stator arms thereof being illustrated schematically;

Fig. 2 is a sectional view of the device shown in Fig. 1 along the line 2—2 thereof including an actual rather than schematic showing of the windings about the stator arms;

Fig. 3 is an electrical circuit diagram for the device shown in Fig. 1 including a first circuit arrangement for supplying balanced input voltages to the windings thereof;

Fig. 4 is an electrical circuit diagram for the device shown in Fig. 1 including an alternative arrangement for supplying balanced input voltages to the windings thereof;

Fig. 5 is an electrical circuit diagram of an alternative arrangement for connecting and exciting the windings of the device shown in Fig. 1;

Figure 6:
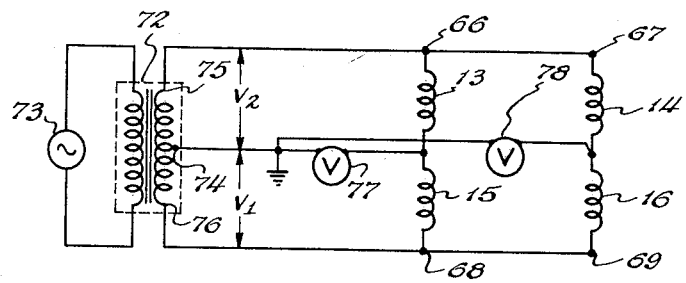
Fig. 6 is a circuit diagram for illustrating the method of electrically centering the rotor relative to the stator of the device shown in Fig. 1.

The signal generator or pick-off device shown in Figs. 1 and 2 comprises a stator 11, armature means comprising a rotor 12, and four inductance coils 13, 14, 15 and 16 having quadraturely arranged axes. The stator 11, rotor 12 and inductance coils 13–16 are all supported in a metallic housing or frame 18.

The stator 11 comprises a magnetic core consisting of a plurality of thin annular laminations of highly permeable magnetic material. Each lamination has four arms of rectangular cross-section extending inwardly along axes displaced 90 degrees from each other. The laminations are joined together by cement or cement and/or bolts (not shown) through four apertures 19–22 therethrough. The four laminated arms of the stator designated by numerals 25–28, respectively, are terminated by arcuate end faces 31–34, respectively. The faces 31–34 are conformal to a cylinder and comprise magnetic poles for the device.

The rotor 12 is also comprised of a plurality of thin laminations of highly permeable magnetic material as is illustrated in Fig. 2, the rotor laminations being joined together by cement, for example. The rotor 12 is supported on a shaft 35 fitting tightly within an aperture through the center of the rotor laminations. A lock-nut 36 threaded on the shaft 35 holds the rotor 12 firmly in place against an enlarged portion 37 of the shaft 35 so that the rotor 12 is properly located therealong for rotation within housing 18 and stator 11.

Opposite curved portions 38 and 38′ of the rotor 12 are conformal to a first cylinder coaxial with the shaft 35. Further opposite curved portions 39 and 39′ of the rotor 12 are conformal to a second cylinder coaxial with the first mentioned cylinder and of smaller diameter. Four flat radial portions 40–43 of rotor 12 are angularly disposed one from the other by 90 degrees about the axis I—I with each of radial portions 40–43 joining an end of curved rotor portion 38 to an adjacent end of curved rotor portion 38′. Thus, the outer surface of rotor 12 includes a variation in its radius for each of coils 13–16 or each of stator arms 25–28. These radial variations occur along the axes of coils 13–16 and stator arms 25–28 with the rotor 12 in the position shown in Fig. 1. In such a position, there is a narrow air gap portion between each of pole faces 31–34 and one or the other of rotor portions 38 and 38′.

Each of the four inductance coils 13–16 is wound around a dielectric bobbin. The bobbins are supported by respective ones of the stator arms 25–28. Three bobbins 44–46 appear in the view of the device shown in Fig. 2, the bobbins being excluded from the view in Fig. 1 since the four inductance coils 13–16 are only shown schematically.

The housing 18 is divided into two parts 47 and 48 containing first and second coaxial ball bearings 49 and 51, respectively. One end of the rotor shaft 35 on one side of rotor 12 fits tightly within the bearing 51 for rotation therewith and is forced therein until the enlarged portion 37 of the shaft is in abutment with an upper portion of a rotatable part of the bearing 51. A portion of the rotor shaft 35 on the other side of the rotor 12 fits tightly within the bearing 49 for rotation therewith, an enlarged portion 52 of the shaft 35 abutting a lower portion of a rotatable part of the bearing 49 when the two housing parts 47 and 48 are clamped together.

The housing parts 47 and 48 are held together by four bolts through four pairs of opposing sleeves disposed around and affixed to the two parts 47 and 48 of housing 18. One of the bolts 54, a nut 56 and one pair of opposing sleeves 57 and 58 through which the bolt 54 fits appear in the view of the device shown in Fig. 2. The stator 11 is rigidly held between inner shoulders 59 and 61 or parts 47 and 48, respectively, when the device is assembled.

Four screws 62–65 are located in a plane perpendicular to the drawing along line II—II in Fig. 2 and are threaded through an annular portion of housing part 47, which portion is slightly larger in diameter than the diameter of the outer boundary of stator 11. The four screws 62–65 are located at points which are displaced one from another by 90 degrees about the axis I—I. Screws 62–65 are employed to provide for lateral displacement of the stator 11 with respect to the rotor 12 in order to electrically center the device as will be described in more detail further along herein.

The terminals at the inner ends of coils 13 and 15 are connected together and the terminals at the inner ends of coils 14 and 16 are connected together as is shown in Fig. 1. Coils 13 and 15 are wound in the same direction and coils 14 and 16 are wound in the same direction so that two series-aiding groups of coils are provided.

Two terminals 66 and 67 at the outer ends of the coils 13 and 14, respectively, are coupled to a balanced alternating current voltage source as is schematically shown in Fig. 1. Two terminals 68 and 69 at the outer ends of coils 15 and 16, respectively, are connected together and to a first output terminal 70 as is also schematically indicated in Fig. 1. Another output terminal 71, which is grounded, is also provided.

An electrical circuit diagram for the signal generator device shown in Fig. 1 with a first circuit arrangement for supplying the inductance coils 13–16 with balanced voltages is shown in Fig. 3. In Fig. 3 the input terminals of a primary winding of an iron-core transformer 72 are supplied by a generator 73 with an alternating current voltage of 115 volts at 400 cycles per second, for example. A center tap 74 at the electrical midpoint of the secondary winding of the transformer 72 divides this winding into two symmetrical coil portions 75 and 76. The center tap 74 is grounded as illustrated in Fig. 3 for providing balanced voltages $V_1$ and $V_2$ across the coil portions 75 and 76, respectively. The high voltage terminals of the coil portions 75 and 76 are connected to the terminals 66 and 67 of the inductance coils 13 and 14, respectively.

The coil portion 75 and the inductance coils 13 and 15 comprise first and second branches of a bridge-type circuit, respectively. The coil portion 76 and the inductance coils 14 and 16 comprise third and fourth branches of the same circuit, respectively. If the total impedance of coils 13 and 15 equals the total impedance of coils 14 and 16 and the voltages $V_1$ and $V_2$ supplied to one pair of alternate junctions 66 and 67 of the circuit are accurately balanced with respect to ground, a substantially zero null output voltage is provided between another pair of alternate junctions of the bridge-type circuit at the terminals 70 and 71.

In order to obtain a null output voltage which is as close to zero as possible and to optimize the linearity of the output voltage signal provided by the device, it may be desired to insure that the device is electrically centered whereby the impedance of coil 13 equals the impedance of coil 15 and the impedance of coil 14 equals the impedance of coil 16. Therefore, the stator 11 is made laterally adjustable in the housing 18 relative to rotor 12 for changing the width of the air gap portions between the stator arms 25–28 and the rotor portions 38 and 38′. This enables the reluctances of the paths for the magnetic fields of coils 13–16 to be changed for compensating for any inhomogeneities in the coils or stator arms 25–28 which may prevent the impedances of opposite coils from being equal for a rotor position which is coaxial with respect to stator 11, for example.

In order to electrically center the rotor 12 with respect to the stator 11, the connections to the terminals 66–69 at the outer ends of coils 13–16 are changed from those shown in Figs. 1 and 3 to provide an arrangement as shown in Fig. 6. An alternating current voltmeter 77 is connected between ground and the junction point between coils 13 and 15 in the latter arrangement. An alternating current voltmeter 78 is also connected between ground and the junction point between coils 14 and 16. The four screws 62–65 shown in Fig. 1 are then adjusted for changing the lateral position of the stator 11 relative to the rotor 12, the relative angular positions of the stator and rotor remaining substantially the same. The stator 11 is laterally adjusted by screws 62–65 until minimum voltage readings are provided on voltmeters 77 and 78 in Fig. 6, whereby the impedance of coil 13 is substantially equal to the impedance of coil 15 and the impedance of coil 14 is substantially equal to the impedance of coil 16, provided the voltages $V_1$ and $V_2$ are balanced with respect to ground.

Slight relative changes in the angular position of the rotor 12 with respect to the stator 11 during the centering procedure have little effect on the readings provided by voltmeters 77 and 78 since the rates of change of the impedances of coils 13–16 caused by angular displacement of rotor 12 are small compared with the rates of change of said impedances caused by relative lateral displacement of the stator 11. Furthermore, since the impedances of the coils about opposing stator arms are being balanced with respect to each other, angular displacements of the rotor 12 are inconsequential during the centering procedure as the impedances of the coils about opposing stator arms will vary equally and in the same direction with angular rotor displacements.

After the pick-off device is centered electrically as aforedescribed, the coils 13–16 are reconnected as shown in Fig. 1. Rotation of armature 12 in a clockwise direction from an angular position substantially as shown in Fig. 1, whereat a substantially zero null output voltage signal is provided at terminals 70 and 71, causes the reluctance of the magnetic flux path from pole face 31 to pole face 33 through the magnetically permeable rotor 12 to decrease thereby increasing the inductances and impedances of coils 13 and 15. At the same time the reluctance for the flux path from pole face 32 to pole face 34 through the rotor 12 increases, thereby decreasing the inductances impedances of coils 14 and 16. Rotor displacement in a counterclockwise direction from the null output voltage position substantially as shown in Fig. 1 causes a reverse situation to obtain whereby the total impedance of coils 13 and 15 decreases and the total impedance of coils 14 and 16 increases.

The foregoing is the case over a range of angular rotor positions whereat the annular rotor portion 38 is simultaneously opposite at least a part of each of the pole faces 31 and 34 and the annular rotor portion 38' is simultaneously opposite at least a part of each of the pole faces 32 and 33. In one device constructed as aforedescribed the angular range of adjustment for which the foregoing occurs is ±20 degrees from an angular rotor position substantially as shown in Fig. 1 whereat a substantially zero null output voltage signal is provided.

Angular rotor displacement from the null position as aforedescribed unbalances the bridge-type circuit in such a manner that the magnitude of the output voltage signal provided at terminals 70 and 71 is substantially a linear function of rotor displacement over the range mentioned above. The phase of the output voltage signal for angular rotor positions in a clockwise direction from the null position is 180 degrees different from the phase of the output voltage signal for angular rotor positions in a counterclockwise direction from the aforementioned null position. It has been found that in such an arrangement as aforedescribed, the output voltage signal is substantially a pure sine wave free of harmonics.

The pick-off device shown in Fig. 1 may also be included in a bridge-type circuit such as is shown in Fig. 4 rather than that shown in Fig. 3. In Fig. 4 resistors 79 and 81 of equal resistance values are utilized to replace transformer 72, the remaining part of the circuit being the same as that of Fig. 3. A junction terminal 82 between resistors 79 and 81 is connected to the grounded output terminal 71. The operation of such a system is essentially the same as has been described before, balanced voltages $V_1$ and $V_2$ being provided across resistors 79 and 81, respectively. It is apparent that two capacitors balanced with respect to ground could be utilized in lieu of the resistors 79 and 81 in Fig. 4 for providing yet another bridge-type circuit which would operate similarly to those described above.

A further way of connecting the coils 13–16 of the device shown in Fig. 1 into a bridge-type circuit arrangement for providing an output voltage signal which is a function of angular rotor displacement is shown in Fig. 5. It should be insured that coils 13 and 15 are in series-aiding relationship and that coils 14 and 16 are in series-aiding relationship as before. The alternating current generator 73 for the arrangement shown in Fig. 5 is connected between one junction of the bridge-type circuit between coils 14 and 15 and an alternate junction between coils 13 and 16. An output voltage signal is provided between the output terminals 70 and 71, terminal 70 being connected to yet another junction of the bridge-type circuit between coils 13 and 14 and terminal 71 being connected to another alternate junction between coils 15 and 16.

When the inductance coils 13–16 of Fig. 1 are connected into a bridge-type circuit as shown in Fig. 5 and the rotor is at an angular null position substantially as shown in Fig. 1, the impedances of coils 13–16 are equal so that a null output voltage signal is provided between terminals 70 and 71 in Fig. 5. Angular displacement of rotor 12 changes the impedance relationships between the coils 13–16 so that an alternating current voltage signal is provided between output terminals 70 and 71 whose magnitude is a linear function of angular rotor displacement and whose phase is dependent on whether the rotor is angularly displaced on one side or the other of its null position. The arrangement of Fig. 5 requires fewer components than the arrangement shown in Figs. 3 and 4, each of the four coils 13–16 of Fig. 5 comprising a separate branch of a four-sided bridge-type circuit.

Figure 7:
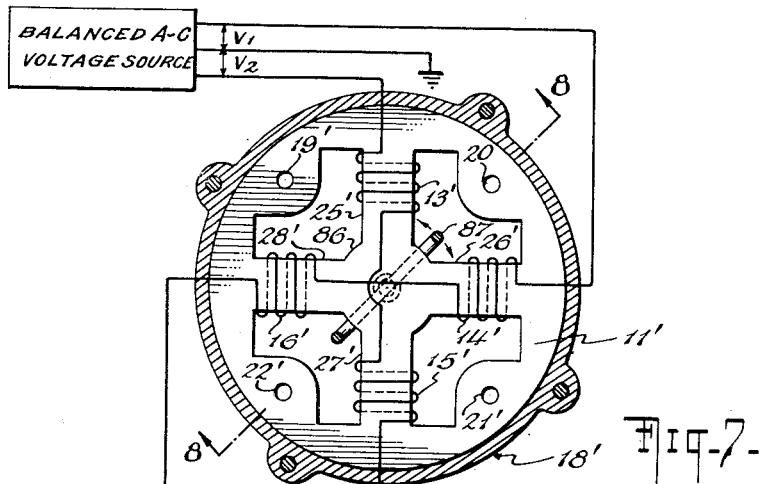
Fig. 7 is a plan view of an electromagnetic pick-off device in accordance with an alternative embodiment of the present invention, stator windings of the device being illustrated schematically.
Figure 8:
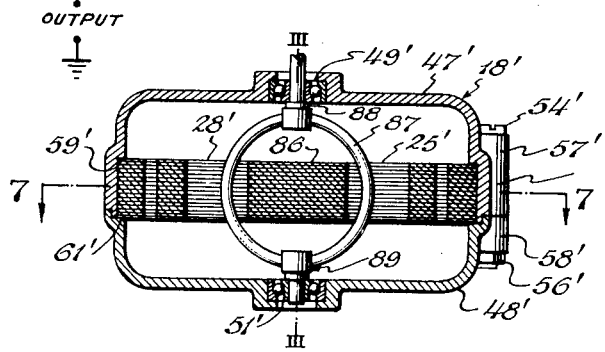
Fig. 8 is a sectional view of the device shown in Fig. 7 taken along the line 8—8 thereof.

A slightly different embodiment of the pick-off device shown in Fig. 1 is illustrated in Figs. 7 and 8. Primed reference numerals are used for parts of the device shown in Figs. 7 and 8 which are similar to parts of the device shown in Fig. 1. Centering screws 62–65 are not provided in the device of Figs. 7 and 8 so the outer periphery of the cylindrical side of stator 11' is in juxtaposition with the inner cylindrical wall of housing 18'.

Four magnetically permeable stator arms 25'–28' are joined at their ends by a magnetically permeable cylindrical piece 86 having its axis concentric with the longitudinal axis III—III (shown in Fig. 8) of the stator 11' and having substantially the same thickness along the axis III—III as the arms 25'–28'. Inductance coils 13'–16' are supported around the stator arms 25'–28', respectively, and are connected together in the same way as shown in Fig. 1 for use in a bridge-type circuit as shown in Fig. 3 or 4. The stator coils 13'–16' could alternatively be connected for forming the bridge-type circuit shown in Fig. 5, if desired.

A ring 87 of copper, for example, is utilized in the device of Figs. 7 and 8 for varying the inductances and, therefore, the impedances of coils 13'–16' rather than a magnetically permeable rotor as shown in Figs. 1 and 2. The ring conductor 87 encircles the cylindrical piece 86 in Figs. 7 and 8 and is supported for rotation about the axis III—III in suitable elements 88 and 89 journalled in ball bearings 49' and 51', respectively.

If the location of the plane of the ring conductor 87 is at a 45 degree angle with respect to the axes of the stator arms 25'–28' as illustrated in Fig. 7, the values of the inductances of coils 13'–16' are decreased by equal amounts from what they would be in the absence of conductor 87. Rotation of ring conductor 87 in a clockwise direction from the aforementioned location causes the inductances of coils 14' and 16' to increase and the inductances of coils 13' and 15' to decrease. Counterclockwise rotation of conductor 87 has an effect on the inductances of coils 13'–16' which is the reverse of that for clockwise rotation.

The foregoing occurs since a loop such as conductor 87 in the magnetic field of an inductance coil has substantially no effect on the coil inductance when the axis of the loop is perpendicular to the axis of the coil and will provide a maximum reduction of coil inductance when the loop axis is aligned with the axis of the coil.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electromagnetic signal generator comprising a stator having two pairs of oppositely disposed inwardly extending arms each of which carries a winding, the windings about opposite ones of said arms being connected in series-aiding relationship with each other, a source of balanced voltage having its two output terminals connected to the ends of the windings carried by one pair of adjacent arms, respectively, the ends of the windings about the other pair of adjacent arms being connected to a common terminal which together with the electrical midpoint of said source of balanced voltage constitute a pair of output terminals for the device, and a rotor that cooperates with said stator for varying the reluctance of the magnetic flux path that passes through the windings carried by one pair of opposite arms and the reluctance of the magnetic flux path that passes through the windings carried by the other pair of opposite arms in opposite directions as said rotor is displaced relative to said stator.

2. The device of claim 1 wherein said pairs of arms are joined to each other at the center of said stator, the rotor of the device comprising a ring-shaped conductor that encircles the junction of said arms, the plane of said ring-shaped conductor being rotatable about an axis that is substantially perpendicular to the axes of the arms of said stator.

References Cited in the file of this patent

UNITED STATES PATENTS

| | | |
|---|---|---|
| 2,457,165 | McNamee | Dec. 28, 1948 |
| 2,490,629 | Jacobs | Dec. 6, 1949 |
| 2,624,027 | Clark | Dec. 30, 1952 |
| 2,657,353 | Wiancko | Oct. 27, 1953 |
| 2,666,892 | Heidorn | Jan. 19, 1954 |
| 2,710,941 | Bonnell | June 14, 1955 |
| 2,736,869 | Rex | Feb. 28, 1956 |

OTHER REFERENCES

Hague: Alternating Current Bridge Methods, 5th ed., Sir Isaac Pitman & Sons, Ltd., 1943, p. 73.